T. D. HEATH.
CULTIVATOR.
APPLICATION FILED MAR. 2, 1909.
945,163.
Patented Jan. 4, 1910.
2 SHEETS—SHEET 1.
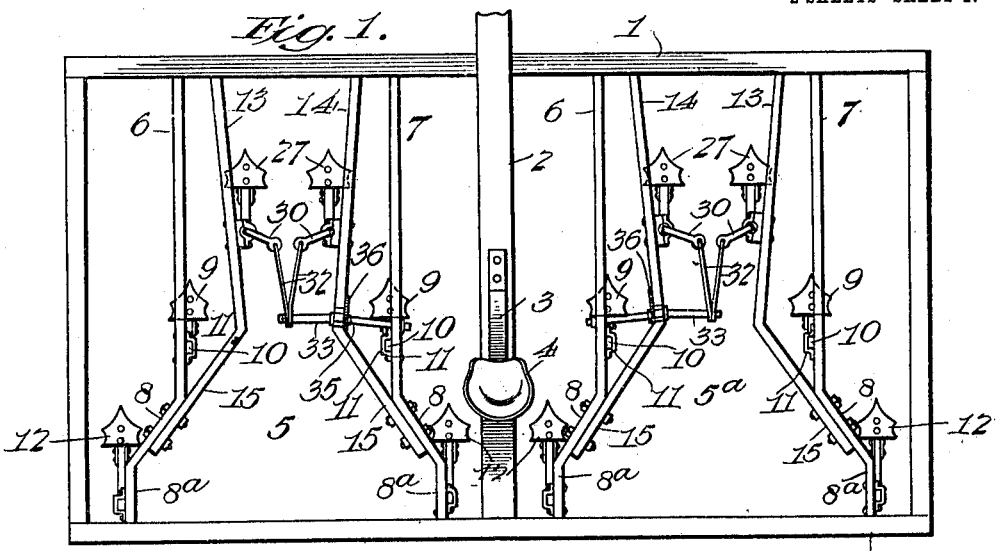
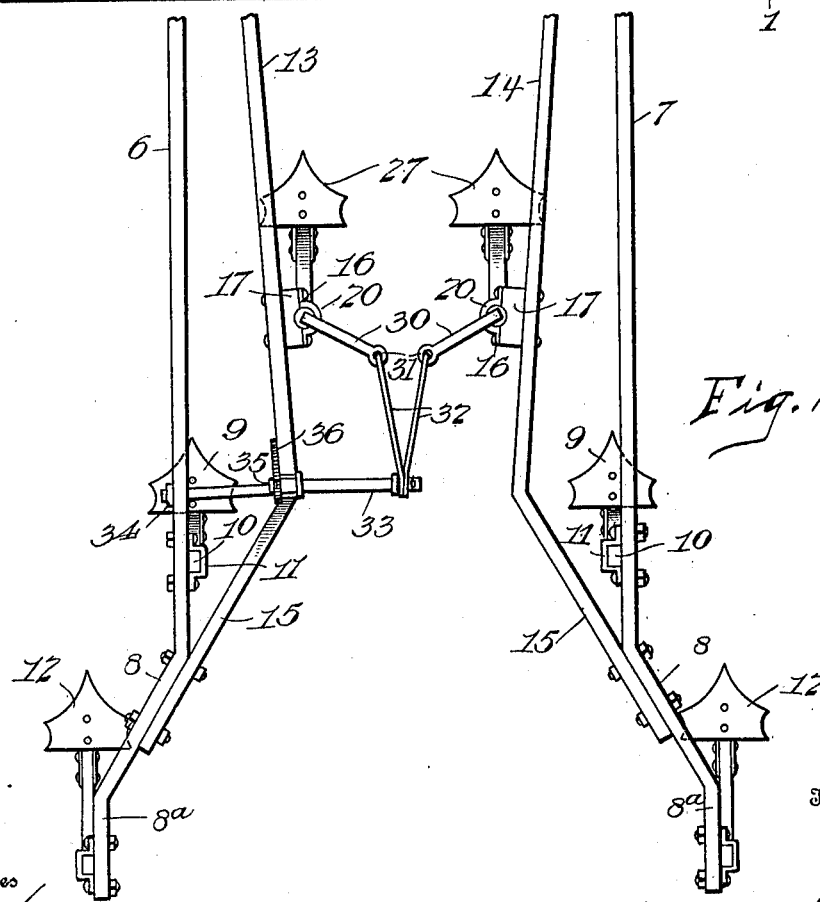
Witnesses
T. L. McKibbee
L. K. Basin.
Inventor
Theodore D. Heath
By E. E. Vrooman
his Attorney.

T. D. HEATH.
CULTIVATOR.
APPLICATION FILED MAR. 2, 1909.
945,163.
Patented Jan. 4, 1910.
2 SHEETS—SHEET 2.
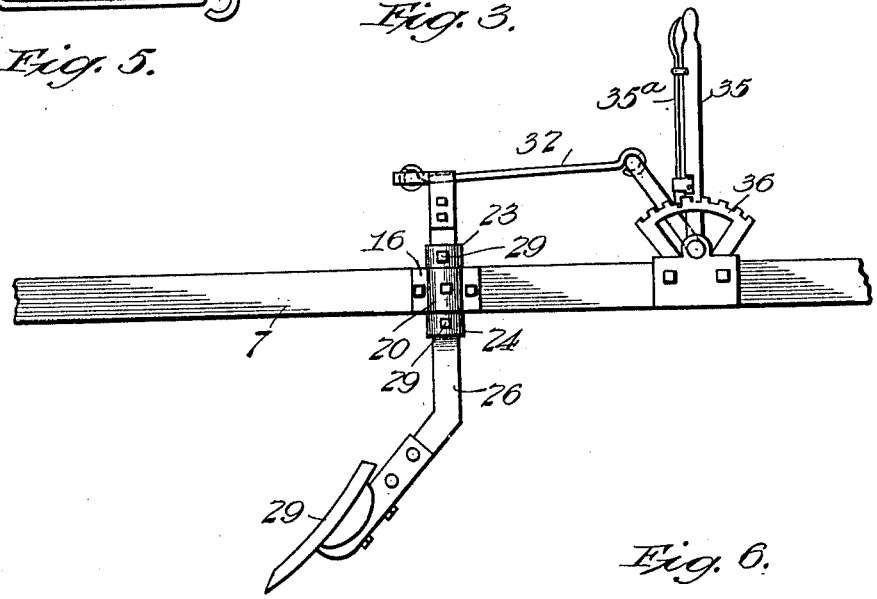
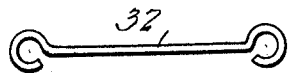
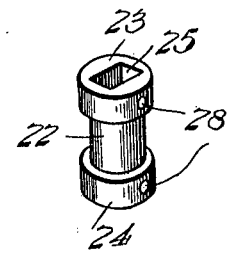
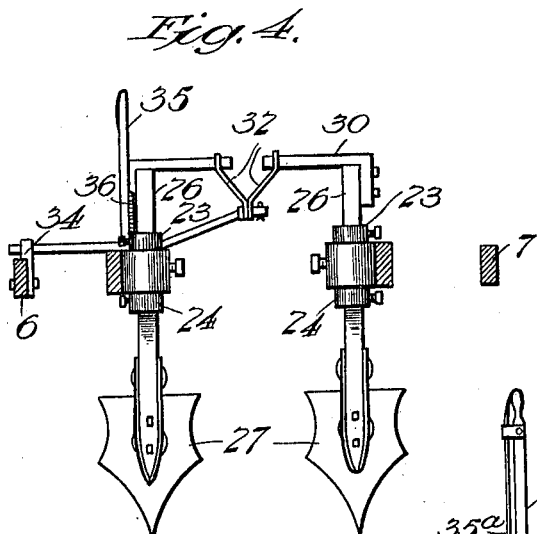
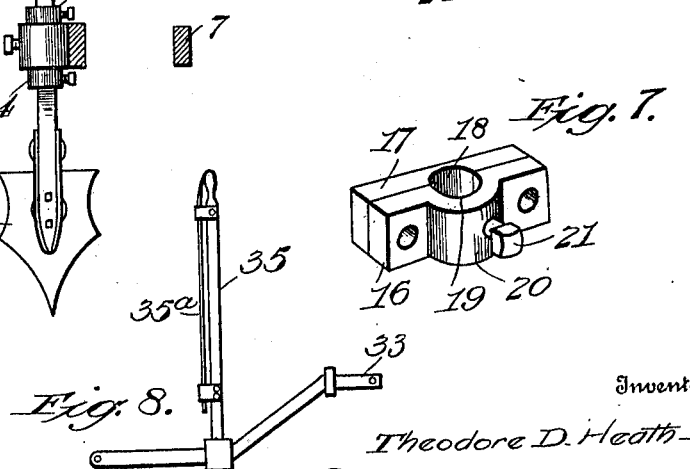
Inventor
Theodore D. Heath
By E. E. Vrooman,
his Attorney
Witnesses
T. L. Mackinne
L. K. Basin though the box when said members are
UNITED STATES PATENT OFFICE.

THEODORE D. HEATH, OF PEABODY, KANSAS.

CULTIVATOR.

945,163.  Specification of Letters Patent.  Patented Jan. 4, 1910.

Application filed March 2, 1909. Serial No. 480,836.

*To all whom it may concern:*

Be it known that I, THEODORE D. HEATH, a citizen of the United States, residing at Peabody, in the county of Marion and State of Kansas, have invented certain new and useful Improvements in Cultivators, of which the following is a specification, reference being had therein to the accompanying drawing.

This invention relates to cultivators or similar agricultural machines, and has specially in view a machine of the type specified in which some of the shovels of the same may have their pitch regulated so that the earth may be thrown around the plants or removed therefrom, as desired or necessary.

The invention is peculiarly applicable to gang machines, and in the form of the invention preferred the shovels thereof are arranged in separate gangs, the shovels of each gang being arranged in staggered relation, and preferably the forward ones of each gang are connected with lever mechanism arranged adjacent to the operator's seat so that their pitch may be altered as desired without the necessity of the driver or operator leaving his seat.

In carrying out the objects of the invention generally stated above it will be readily understood that the same is susceptible of changes in details and structural arrangements, one simple and practical embodiment of which is shown in the accompanying drawings, wherein—

Figure 1 is a top plan view of a gang cultivator equipped with the present invention. Fig. 2 is a similar view, on an enlarged scale, of one of the gangs of the cultivator. Fig. 3 is a side elevation of a portion of the cultivator, showing the lever mechanism for controlling some of the shovels thereof. Fig. 4 is a transverse sectional view of the forward portion of one of the gang frames, showing the connection between the front shovels thereof and their lever mechanism. Fig. 5 is a detail side elevation of one of the connecting links of the lever mechanism. Fig. 6 is a perspective view of a bearing sleeve for the standards of the movable shovels. Fig. 7 is a similar view of the bearing boxes for the sleeve shown in Fig. 6. Fig 8 is a detail elevation of the hand lever for operating the movable shovels.

In the accompanying drawings, a main frame 1 has been shown which is provided with a central, longitudinally extending supporting beam 2 upon which a spring standard 3 is mounted, the free end of which carries the seat 4 for the operator. The central beam 2 may be extended forwardly beyond the main frame and have suitable connections with the draft gear, not shown. The said central beam 2, divides the main frame into two portions for the reception of supplemental frames 5 and 5ª, respectively, each being of duplicate construction, and composed of straight parallel, spaced apart side or outer bars 6 and 7, the rear ends of which are inclined outwardly, as indicated at 8 and terminate in straight portions 8ª. A shovel blade 9 has its standard 10 suitably mounted in a socket 11 carried by the bars 6 and 7 adjacent to their outwardly inclined portion 8 and the straight rear ends 8ª of the said bars are also similarly equipped with a shovel blade 12. Inner spaced-apart bars 13 and 14 also form a part of each gang frame, said bars 13 and 14 being inclined inwardly at their front portion and terminate in outwardly flared ends 15 which are bolted or otherwise detachably secured to the inclined portions 8 of the bars 6 and 7. The inner bars 13 and 14 are each equipped with a sectional bearing box, the members 16 and 17 of which are complementally recessed as indicated at 18—19 whereby a bearing opening is formed through the box when said members are brought together. Said box is held in rigid, but detachable engagement with the oppositely disposed inner faces of the bars 13 and 14, and one of the members of the bearing boxes, such as 16, may be formed with an outwardly rounded portion 20 having a set screw 21 passing therethrough and into its recess, the function of which will presently appear. As is shown more clearly in Figs. 1 and 2 of the accompanying drawings, the bearing boxes of the inner bars of each frame, are arranged at a point somewhat in advance of the shovels 9.

A bearing sleeve 22 is rotatably fitted within the bearing box of each inner bar, said sleeve being provided with end collars 23 and 24 which limit the vertical movements of the sleeve relative to the bearing box. The sleeves may be provided with a rectangular or other opening 25 for the standards 26 of the shovels 27 and are also provided with transversely extending openings 28 in each collar for the reception of set screws or bolts 29 for retaining the said standards in the desired adjusted position. The upper end of each standard projects beyond the upper end collar of its bearing sleeve and has a bolted connection with one end of an inwardly extending crank arm 30 which may be provided with an eye 31 in its free end for the reception of a hook-shaped end of a connecting link 32 which connects said crank arm 30 with a crank arm 33 mounted in bearings 34 upon the bars 6 and 13 of the gang frames. The crank arm 33 is operated by means of a vertically disposed hand lever 35 carried by each bar 6 of the gang frames and is provided with a hand-controlled pawl 35ª adapted for engagement with a ratchet segment 36 also carried by said bars 6.

It will be seen from the foregoing that by the described arrangement of main frame and the supplemental frames, the teeth or shovels are arranged in a staggered relation in each gang frame, and it will also be seen that by manipulating the hand levers 35 of each supplemental frame, the two front shovels thereof may be readily shifted to either the right or left, and thereby effectively control the direction in which the earth is thrown, and as the mechanisms for controlling the movements of said front shovels are located on each side of and closely adjacent to the operator's seat, it will be seen that the machine may be readily operated by one person. It will also be seen that by means of the improved bearing boxes and the bearing sleeves, the front shovels may be locked in any desired position by manipulating the set screw 21 to cause the same to bind upon the sleeve, the latter will be held rigid with its bearing box and thereby prevent any turning movement of the shovel.

Another distinctive feature of the invention is the link connection between the crank shaft of the above standards and the crank arm of the hand lever. It will be observed by reference to Figs. 1, 2 and 5, that said link by virtue of being provided with hooks at each end, practically forms a universal connection between the two cranks, whereby the standards may be adjusted vertically within their sleeves without interfering with the hand-controlled lever mechanism carried by the bars 6.

What I claim as my invention is:—

1. A machine of the character described, comprising a main frame with an operator's seat, a gang frame on each side thereof, consisting of pairs of bars connected with and supported by the front and rear of the main frame, each gang frame having suspended therefrom sets of shovels, comprising pairs of shovels arranged from front to rear of said frame and in staggered relation to each other, the front pair of shovels being mounted in swiveled hangers, and the remaining shovels fixed, a crank arm on the upper end of each swiveled hanger, a crank shaft on the gang frame, links connecting said crank arms with said crank shaft, and an operating lever on said shaft adjacent to the driver's seat.

2. A machine of the character described, comprising a main frame with an operator's seat, a gang frame on each side thereof, consisting of pairs of inner and outer bars supported in front and rear said frame, and having inclined rear portions connected together, stationary shovels on standards depending from the rear portion of said gang frame, the several shovels being located in staggered relation to each other, a sectional bearing box on each inner bar, a vertically adjustable bearing sleeve rotatably fitting each bearing box and having adjustable end collars, each of said swiveled hangers extending through one of said collars, a crank arm on the upper end of each of said swiveled hangers, a crank shaft on the gang frame, links connecting said crank shaft with said crank arms, and an operating lever on the crank shaft adjacent to the operator's seat.

In testimony whereof I hereunto affix my signature in presence of two witnesses.

THEODORE D. HEATH.

Witnesses:
H. A. GAMHART,
H. A. SHANK.